US005682951A

United States Patent [19]
Sydansk

[11] Patent Number: 5,682,951
[45] Date of Patent: Nov. 4, 1997

[54] FOAMED GEL COMPLETION, WORKOVER, AND KILL FLUID

[75] Inventor: Robert D. Sydansk, Littleton, Colo.

[73] Assignee: Marathon Oil Company, Findlay, Ohio

[21] Appl. No.: 570,178

[22] Filed: Dec. 7, 1995

[51] Int. Cl.$^6$ ............................................. E21B 33/13
[52] U.S. Cl. ................................. 166/292; 166/309
[58] Field of Search ............................... 166/279, 284, 166/285, 292–294, 309

[56] References Cited

U.S. PATENT DOCUMENTS

| | | | |
|---|---|---|---|
| 4,282,928 | 8/1981 | McDonald et al. | 166/274 |
| 4,391,925 | 7/1983 | Mintz et al. | 523/130 |
| 4,453,596 | 6/1984 | Conway et al. | 166/278 |
| 4,675,119 | 6/1987 | Farrar et al. | 252/8.514 |
| 4,683,949 | 8/1987 | Sydansk et al. | 166/270 |
| 4,726,906 | 2/1988 | Chen et al. | 252/8.51 |
| 4,740,319 | 4/1988 | Patel et al. | 252/8.515 |
| 4,947,935 | 8/1990 | Sydansk | 166/295 |
| 4,989,673 | 2/1991 | Sydansk | 166/250 |
| 4,995,461 | 2/1991 | Sydansk | 166/295 |
| 5,105,884 | 4/1992 | Sydansk | 166/270 |
| 5,259,453 | 11/1993 | Johnston | 166/295 |
| 5,322,125 | 6/1994 | Sydansk | 166/295 |
| 5,421,410 | 6/1995 | Irani | 166/294 |
| 5,476,145 | 12/1995 | Sengul et al. | 166/295 |
| 5,495,891 | 3/1996 | Sydansk | 166/295 |

FOREIGN PATENT DOCUMENTS 0 356 242 A2  2/1990  European Pat. Off. .

OTHER PUBLICATIONS

Ainley, "Development of Foam Fracturing and Cementing Fluids for Use in Tight Gas Sands," presented at AIChE, Denver, Colorado, Aug.28–31, 1983.

Sydansk, R. D., SPE *Advanced Technology Series*, "Polymer–Enhanced Foams Part 1: Laboratory Development and Evaluation," vol. 2, No. 2, Apr., 1994, pp. 150–159, SPE Paper 25168.

Hudson et al., Fluid Loss Control Through the Use of a Liquid–Thickened Completion and Workover Brine, SPE 10652, presented at SPE Formation Damage Control Symposium, Lafayette, Louisiana, Mar. 24–25, 1982.

Ennis, "Case History of Restimulations in Western Oklahoma," SPE 18861, presented at the SPE Production Operations Symposium, Oklahoma City, Oklahoma, Mar. 13–14, 1989.

*Primary Examiner*—Roger J. Schoeppel
*Attorney, Agent, or Firm*—Jack L. Hummel; Jack E. Ebel

[57] ABSTRACT

A process employing a foamed gel in a wellbore as a completion, workover, or kill fluid. The foamed gel is formed from an aqueous solvent, a water-soluble carboxylate-containing polymer crosslinked by a crosslinking agent containing a reactive transition metal cation, a surfactant, and an added gas. The foamed gel is placed in the wellbore, where it substantially prevents the flow of formation fluid into or out of the wellbore. The completion, workover, or kill operation is then performed. Alternatively, the foamed gel may be combined with another completion, workover, or kill fluid after commencing a wellbore operation.

27 Claims, No Drawings

FOAMED GEL COMPLETION, WORKOVER, AND KILL FLUID

BACKGROUND OF THE INVENTION

1. Technical Field

The present invention relates to a process for use during completion, workover, and kill operations performed in a well penetrating a subterranean formation, and more particularly to a process wherein a foamed gel is employed as a completion, workover, or kill fluid for well completions, workovers, and other procedures for which it is desirable to kill a well.

2. Description of Related Art

Subterranean well completion, workover, and kill operations are normally conducted while the well is filled with fluid. A completion, workover, or kill fluid is commonly placed in a wellbore prior to the operation and is often maintained in the wellbore for the duration of the operation. The completion, workover, or kill fluid applies a hydrostatic pressure against the formation fluid which is greater than the pressure exerted by the formation fluid attempting to intrude into the wellbore. This overbalanced hydrostatic pressure prevents the intrusion of formation fluids into the wellbore during performance of the given oil field wellbore operation, which is necessary from an operational standpoint to prevent interference from formation fluids and from a safety standpoint to prevent blowouts and well kicks. In uncased wells, maintaining an overbalanced hydrostatic pressure also helps prevent the wellbore wall from caving in or sloughing into the wellbore. Other functions of completion, workover, and kill fluids are to minimize fluid loss from the wellbore into the surrounding formation, to help support casing and tubing strings, and to provide a medium through which completion and workover operations can be performed.

There are a number of well-known conventional completion, workover, and kill fluids which comprise high-density dispersions of fine solids in an aqueous liquid or a hydrocarbon liquid. The solid component of such a dispersion may be a "weighting agent" added to increase the fluid density, thereby providing a greater hydrostatic pressure in the wellbore. Weighting agents are generally inert inorganic solids in solution or suspension. An exemplary completion, workover, or completion, workover, and kill fluid is a dispersion of clay and/or gypsum in water.

Although conventional completion, workover, and completion, workover, and kill fluids perform satisfactorily in many subterranean applications, high-density completion, workover, and kill fluids are generally unsuitable where the hydrostatic pressure gradient of the completion, workover, or kill fluid is greater than the fracture or parting pressure gradient of the rock surrounding the wellbore. Thus, conventional foams, consisting of a gas contained within an aqueous liquid medium, have been employed as alternative completion, workover, and kill fluids in formations susceptible to fracturing. The gas decreases the fluid density to a value sufficient to maintain an overbalanced condition in the well without hydraulically fracturing the formation.

Advantageous completion, workover, and kill fluids are those which prevent formation fluid intrusion into the wellbore while preventing appreciable wellbore fluid leakoff into the formation. Leakoff is the migration of the completion, workover, or kill fluid from the wellbore across the wellbore face into the surrounding formations, resulting in loss of the fluid. Fluid leakoff can undesirably result in formation damage, or permeability reduction, which decreases hydrocarbon recovery from the formation or injectivity into the formation. Reduction in the fluid flow capacity can arise from relative permeability effects when an aqueous fluid invades an oil- or gas-bearing formation or as a result of chemical reactions with minerals, such as clays, present in the formation. Leakoff is also undesirable because it requires replacement of the lost completion, workover, or kill fluid. Although it is possible to maintain the hydrostatic pressure overbalance in the face of severe fluid leakoff by replenishing the lost completion, workover, or kill fluid, this practice can be cost prohibitive. Thus, minimizing leakoff decreases the cost of the completion, workover, or kill operation. Leakoff can also result in a well blowout with serious safety and environmental consequences.

In response to the problem of leakoff, it is common to place a fluid in the wellbore containing lost circulation materials, additives that specifically inhibit fluid communication between the wellbore and surrounding formations across the wellbore face. Lost circulation materials are frequently polymeric species as described in U.S. Pat. Nos. 4,740,319; 4,726,906; 4,675,119; and 4,282,928. A liquid medium having a lost circulation material dissolved or dispersed therein is termed a lost circulation fluid. Despite the general effectiveness of many conventional lost circulation fluids, certain subterranean conditions remain problematic for such fluids. In particular, conventional lost circulation fluids often do not effectively inhibit lost circulation in formations having relatively high permeability matrix or relatively high permeability anomalies. Conventional lost circulation fluids may also be inapplicable in water-sensitive formations or formations susceptible to fracturing or parting.

Thickeners are often included in weighted completion, workover, and kill fluids known in the art for leakoff inhibition. See, for example, Hudson et al., SPE Paper No. 10652, which discloses a weighted brine containing a fluid loss control agent, or U.S. Pat. No. 4,391,925 to Mintz et al., which discloses a multiphase kill fluid comprising a number of constituents including a hydrocarbon, a surfactant, a clay, and an organic polymer.

Under downhole conditions where the wellbore is in direct communication with high permeability anomalies, it can be extremely difficult to prevent fluid leakoff. Conventional completion, workover, and kill fluids generally do not exhibit sufficient flow resistance to prevent them from escaping the wellbore into the formation via the high permeability anomalies. Conventional completion, workover, and kill fluids may also be unsuitable in water-sensitive formations because of the risk of formation damage due to incompatibilities between the completion, workover, and kill fluid and the formation, particularly when leakoff does occur. Further, if leakoff occurs, conventional completion, workover, and kill fluids are often difficult to remove from the formation.

Conventional foam may have increased flow resistance, but they often lack sufficient structure to adequately stop leakoff and tend to reduce the rate of fluid loss, rather than stopping leakoff altogether. Conventional foams may be more compatible with the formation, but they exhibit relatively high instability and high leakoff rates under certain formation conditions. For example, conventional foams tend to exhibit instability in the presence of crude oil and collapse rapidly into separate gas and liquid phases. In addition, conventional foams often degrade when placed in formations having high downhole temperatures or in formations having brines exhibiting a high salt or hardness content.

Crosslinked polymer gels as taught by U.S. Pat. No. 4,989,673 have demonstrated performance advantages over the above-recited conventional completion, workover, and kill fluids and lost circulation fluids because, in many instances, the gels effectively inhibit fluid loss in formations having high permeability matrix or high conductivity anomalies while generally avoiding significant damage to water-sensitive formations. The relatively high cost of chemicals used in crosslinked polymer gels, however, often limits their practical utility from an economic standpoint. Crosslinked polymer gels also have a relatively high hydrostatic pressure gradient in the wellbore that is undesirable for formations susceptible to fracturing or parting by conventional fluids of normal density. Gels are also difficult to remove from the formation when leakoff has occurred.

Despite the existence of numerous completion, workover, and kill fluids in the art, many have limited utility. Thus, a need exists for a completion, workover, and kill fluid having utility in hydrocarbon recovery operations over a broad range of operating conditions which can be encountered in situ. Specifically, a need exists for a low density completion, workover, and kill fluid which effectively maintains a sufficient hydrostatic pressure in the wellbore under adverse conditions to prevent or minimize the intrusion of formation fluids into the wellbore without exhibiting significant leakoff into the formation. A need also exists for a completion, workover, and kill fluid which does not damage the hydrocarbon formation significantly. A further need exists for a completion, workover, and kill fluid which does not induce hydraulic fractures in the adjacent subterranean formation when the formation exhibits an unusually low parting and/or fracture pressure. The completion, workover, or kill fluid should be inexpensive and easily prepared at the wellsite from readily available constituents. The fluid should be nonflammable, nontoxic, and chemically unreactive with surface and wellbore hardware. Further, the fluid should have a consistency which permits downhole operations through it. In addition, the fluid should be easy to remove completely from the wellbore after the completion, workover, or kill operation is finished.

Accordingly, it is an object of the present invention to provide a completion, workover, and kill fluid that effectively performs in a subterranean formation having a relatively low fracture or parting pressure gradient without substantially fracturing or parting the formation.

It is another object of the present invention to provide a completion, workover, and kill fluid that effectively prevents leakoff under a broad range of subterranean conditions.

It is yet another object of the present invention to provide a completion, workover, and kill fluid that is relatively stable under harsh formation conditions including the presence of high temperatures, crude oil, high salinity brines, or high hardness brines.

It is still another object of the present invention to provide a completion, workover, and kill fluid to form a completion, workover, and kill fluid that effectively prevents leakoff in a subterranean formation exhibiting relatively high permeability or high permeability anomalies.

It is a further object of the present invention to provide a completion, workover, and kill fluid that is cost effective and practical to use in the field.

It is a still further object of the present invention to provide a completion, workover, and kill fluid which has a consistency that permits downhole operations to be performed through it.

It is yet a further object of the present invention to provide a completion, workover, and kill fluid which is easy to remove from the wellbore and the formation adjacent the wellbore after the completion, workover, or kill operation is finished,

SUMMARY OF THE INVENTION

To achieve the foregoing and other objects, and in accordance with the purposes of the present invention, as embodied and broadly described herein, one embodiment of the present invention is characterized as a process for substantially reducing the flow of fluid between a subterranean formation and a wellbore penetrating the formation. The formation is below an earthen surface and contains a formation fluid. A foamed gel is formed, comprising an aqueous solvent, a water-soluble carboxylate-containing polymer crosslinked by a water-soluble crosslinking agent containing a reactive transition metal cation, a water-soluble surfactant, and an added gas. A volume of the foamed gel is placed in the wellbore. The volume is sufficient to create a hydrostatic head which exerts a fluid pressure against the formation fluid substantially equal to or greater than the formation fluid pressure. The foamed gel substantially prevents the flow of formation fluid into the wellbore and the flow of foamed gel into the formation. A wellbore operation, such as a completion, workover, or kill operation, is then performed.

In another embodiment of the present invention, a wellbore operation, such as a completion, workover, or kill operation, is initiated in the wellbore. A foamed gel is formed, comprising an aqueous solvent, a water-soluble carboxylate-containing polymer crosslinked by a water-soluble crosslinking agent containing a reactive transition metal cation, a water-soluble surfactant, and an added gas. A volume of the foamed gel is placed in the wellbore, where the volume of foamed gel is sufficient to create a hydrostatic head which exerts a fluid pressure against the formation fluid. The hydrostatic head is substantially equal to or greater than the formation fluid pressure, and the foamed gel substantially prevents the flow of formation fluid into the wellbore and the flow of foamed gel into the formation. The wellbore operation is continued after the volume of foamed gel is placed in the wellbore.

DESCRIPTION OF PREFERRED EMBODIMENTS

The present invention is a process employing a material which prevents or minimizes the substantial flow of formation fluids into the wellbore during the performance of conventional oil field wellbore operations, such as completion, workover, and kill operations, while simultaneously preventing or minimizing the leakoff of wellbore fluids into the formation matrix. The material employed in the present process is a foamed gel formed by combining a gas with an aqueous gelation solution containing a crosslinkable polymer, a crosslinking agent, and a surfactant. If desired, the completion, workover, or kill fluid of the present invention may also comprise additives known to those skilled in the art, such as a solid particulate material for leakoff prevention, a foam breaker, and/or a gel breaker.

A number of specific terms are used throughout the specification to describe the process of the present invention and are defined as follows. A "formation" is a subterranean geological structure consisting essentially of "matrix," and, in some instances, high permeability anomalies. A "reservoir" is a hydrocarbon-bearing formation. The term "wellbore" is defined as a borehole extending from the earth surface to a formation. Thus, a wellbore is a conduit providing fluid communication between the surface and the formation penetrated thereby. A wellbore can be used for either fluid production from a formation or fluid injection into a formation. The term "well" is synonymous with the term "wellbore." The term "wellbore face" is the interface between a wellbore or void and the formation matrix, i.e., the walls of the wellbore or the walls or boundaries of voids in direct communication with the wellbore. "Anomalies" have a permeability approaching to that of the bore hole and significantly greater than that of the matrix. Anomalies include fractures, fracture networks, cracks, joints, caverns, rugs, cavities, washouts, cobble packs, high-permeability unconsolidated sands, and the like, which may be proximal or which may extend far away from the wellbore. The "matrix" is homogeneous, continuous, material having a permeability which is substantially less than that of the wellbore or anomalies. "Direct communication" means that the anomalies are not separated from the wellbore by intervening matrix. "Plugging" is a substantial and essentially complete reduction in permeability. A "completion, workover, and kill" fluid is a fluid which is utilized in an open or cased well during a completion, workover, kill, or other procedure when it is desirable or necessary to prevent flow of formation fluids into or out of the wellbore.

A "gel" or "gel medium" is a continuous three-dimensional chemically crosslinked polymeric network integrating a liquid into the interstices of the network. "Complete gelation" means that the gel composition is incapable of further crosslinking because one or both of the required reactants in the initial solution are essentially consumed. Further crosslinking is only possible if either more polymer, crosslinking agent, or both are added to the gel composition. Before crosslinking is completed, the foamed gel is characterized as being immature. When crosslinking has gone to completion, and the foamed gel is characterized as being mature. A "foamed gel" is a composition having a stabilized gas dispersion within a gel medium. The foamed gel structure is made up of gas bubbles separated from one another by interfacially stabilized films of the gel medium. Other terms used herein have definitions in accordance with the conventional usage of a skilled artisan, unless otherwise defined hereafter.

The solvent of the gelation solution is substantially any aqueous liquid capable of forming a gelation solution from the solvent, crosslinkable polymer, crosslinking agent and surfactant. The term "solution" as used herein, in addition to true solutions, is intended to broadly encompass dispersions, emulsions, or any other homogeneous mixture of the gelation solution components in the aqueous solvent. The solvent is a fresh water or a brine, such as sea water or produced water from a subterranean formation. Produced water can be advantageous because of its low-cost and ready availability, and because it enables the practitioner to return produced water to the formation, thereby avoiding more costly and less environmentally compatible methods of disposing the produced water.

Although many crosslinkable polymers are known in the art, the crosslinkable polymers specifically applicable to the present invention am water-soluble carboxylate-containing polymers, including biopolymers and synthetic polymers. As used herein, the term "soluble" refers broadly to true solutions, dispersions, emulsions, or any other homogeneous mixtures of the solute in the solvent. Preferred among the carboxylate-containing polymers are acrylamide-containing polymers. Of the acrylamide-containing polymers, the more preferred are polyacrylamide (PA); partially hydrolyzed polyacrylamide (PHPA); and copolymers, terpolymers, and tetrapolymers of acrylamide. Exemplary polymers include copolymers of acrylamide and acrylate, and acrylamide copolymers, acrylamide terpolymers, or acrylamide tetrapolymers containing 2-acrylamido-2-methylpropanesulfonic acid or salts thereof (AMPS) or vinylpyrrolidone. PA, as defined herein, has from about 0% to about 1% of its amide groups hydrolyzed. Although 0% hydrolyzed PA initially lacks any carboxylate groups, it can undergo autohydrolysis under the conditions of the present process to generate carboxylate groups, thereby satisfying the definition of a carboxylate-containing polymer having utility within the scope of the present invention. PHPA has greater than about 1% but less than 100% of its amide groups hydrolyzed to carboxylate groups. The average molecular weight of an acrylamide polymer having utility herein is generally in a range between about 100,000 and about 30,000,000, and preferably between about 200,000 and about 25,000,000. The polymer concentration of the gelation solution is generally at least about 500 ppm, preferably at least about 2,000 ppm, and most preferably within a range between about 5,000 ppm and about 100,000 ppm.

The crosslinking agent of the present invention effectuates chemical crosslinking between carboxylate groups of the same or other polymer molecules, thereby creating the network structure of the gel medium. Crosslinking agents having utility herein are compositions containing a reactive transition metal cation. Such compositions include organic or inorganic salts of the reactive transition metal cation. Other such compositions having utility herein as crosslinking agents include water-soluble complexes containing the reactive transition metal cation associated with an organic carboxylate anion or an inorganic anion. The preferred crosslinking agents are organic salts and complexed of trivalent chromium. The trivalent chromium cation concentration of the gelation solution is generally between about 10 ppm and about 20,000 ppm, and preferably between about 20 ppm and about 4,000 ppm. The crosslinking agent is present in amounts such that the molar ratio of the carboxylate anions of the crosslinking agent to the trivalent chromium cations of the gelation solution is preferably between about 0.5:1 and 100:1 and preferably between about 3:1 and 25:1.

The term "organic carboxylate anion" as used herein encompasses carboxylate anionic species including monocarboxylate anions, such as acetate and propionate; polycarboxylate anions, such as malonate; and substituted derivatives of carboxylate artions, such as glycolate, lactate, and citrate. The carboxylate anions are generally obtained from the corresponding acids or salts thereof. Preferred among such complexes are those including a trivalent chromium cation complexed with the carboxylate anion. An example of such a preferred complex is the trivalent chromium cation complexed with the acetate anion to form chromium triacetate as taught in U.S. Pat. No. 4,683,949, incorporated herein by reference. The chromium triacetate complex can be in the form of, or derived from, solid $CrAc_3$, solid $CrAc_3 \cdot H_2O$, solid $Cr_3Ac_7(OH)_2$ or a solution labeled "Chromic Acetate 50% Solution" that is commercially available, for example, from McGean Rohco Chemical Co., Inc., 50 Public Square, Suite 1250, Cleveland, OH 44113-2251, U.S.A.

The surfactant may be substantially any conventional anionic, cationic, or nonionic surfactant which is distributed throughout the aqueous phase of the gel medium to stabilize the interfaces between the solvent and gas. Anionic, cationic and nonionic surfactants are well known in general and are commercially available. Unlike conventional oilfield foams, the present foamed gel has been found to be relatively insensitive to the chemistry of the employed surfactants. Specific surfactants having utility in the present invention include ethoxylated sulfates, ethoxylated alcohols, petroleum sulfonates, and alpha olefin sulfonates. The surfactant concentration in the gelation solution is about 10 ppm to about 50,000 ppm, preferably about 100 ppm to about 10,000 ppm, and most preferably about 200 ppm to about 8,000 ppm.

The added gas may be substantially any gas that is substantially unreactive with the above-recited polymer, crosslinking agent, solvent, and surfactant components and that is capable of being dispersed throughout the liquid medium. Examples of added gases having utility herein are air, nitrogen, methane, carbon dioxide, nitrous oxide, natural gas, produced gas, and flue gas. Nitrogen, natural gas, produced gas, or carbon dioxide are preferably used in the production of the present foamed gels.

Preparation of the foamed gel proceeds by combining the added gas with the aqueous gelation solution. The added gas can be combined with the gelation solution by conventional foam generation means such as sparging, high speed mixing, or simultaneously flowing the gas and gel composition through one or more orifices, such as a screen or a plate with one or more orifices, or through a solid packing, such as a sandpack or a gravel pack. The location and timing of the gas addition step can be any one of several alternatives, including at the surface prior to injection of the foamed gel into the wellbore, at the surface simultaneous with coinjection of the gelation solution into the wellbore, or in the wellbore.

The volumetric gas content of the foamed gel, termed foam quality, is expressed as the volume percent of gas in the foamed gel at a specified pressure and temperature. As is apparent to one skilled in the art, the foam quality in a column of foam in a wellbore decreases with increasing depth due to the increasing hydrostatic pressure. Thus, it is useful to describe a foamed gel in a wellbore in terms of an average foam quantity. Foamed gels having utility in the present process generally have an average foam quality between about 20% and about 99%, preferably between about 50% and about 98%, and most preferably between about 70% and about 97% at reservoir temperature and pressure. The foam quality of the foamed gel is selected within the limits set forth above as a function of the specific application of the foamed gel. Foamed gel strength is usually an inverse function of foam quality. Thus, if a high strength foamed gel is desired, the foamed gel is formulated with a relatively low foam quality. Conversely, if a lower strength, less costly, or lower density foamed gel is desired, the foamed gel is formulated with a higher foam quality. It is noted that high strength foamed gels have specific application for plugging anomalies adjacent the wellbore.

The integral components of the foamed gel are the gel medium and the added gas dispersed therein. The crosslinked polymer makes up the structural network of the gel medium, and the liquid solvent makes up the interstitial liquid of the medium. The gas is usually added to the gel prior to completion of crosslinking. For acrylamide polymers containing carboxylate groups, crosslinking, or gelation as it is alternatively termed, is normally initiated as soon as the polymer and crosslinking agent contact. For unhydrolyzed PA, crosslinking does not normally occur until the PA has undergone a significant degree of hydrolysis. Thus, the rate and extent of crosslinking of the unhydrolyzed PA are functions of the polymer hydrolysis reaction. The length of the delay time for the PA crosslinking reaction increases as the molar ratio of carboxylate to chromium ions increases. In the process of the present invention, it is often desirable that the foamed gel be crosslinked to completion prior to placement of the foamed gel in the wellbore. Thus, it is preferable that the PA be at least partially hydrolyzed.

The physical properties of the foamed gel are a function of the specific foamed gel components and their relative proportions. It is primarily the character of the gel medium that contributes to the structure, viscosity, and stability of the foamed gel, and the viscosity of foamed gels can range from highly viscous to viscosities approaching that of water. In general, the degree of structure, viscosity, and stability of a foamed gel containing an acrylamide polymer are increased by increasing the polymer concentration of the liquid phase. However, an oftentimes more cost-effective and preferred means for achieving the same effect is to employ a polymer having a higher molecular weight and/or a higher degree of hydrolysis at a relatively fixed concentration. Conversely, a reduction in the degree of structure and viscosity is achieved by using a lower molecular weight polymer or, alternatively, one having a lower degree of hydrolysis. Thus, the skilled practitioner can select the polymer, crosslinker, surfactant types and concentrations, and foam qualities to create foamed gels across a wide range of viscosities, structures, stabilities, and densities as desired, thereby ensuring the effective performance of the foamed gel as a completion, workover, or kill fluid, in accordance with the fracturing or parting pressure gradient and the permeability of the formation through which the wellbore passes. The selection of the polymer, crosslinker, and surfactant types and concentrations may also be based on factors such as cost and availability of the components and an increased rate of PA hydrolysis at higher temperatures.

Relative to conventional oilfield foams, the present foamed gel is significantly more stable over a wide range of temperatures, pressures, and formation water salinities and hardnesses. The foamed gel is also highly stable in the presence of liquid hydrocarbons such as crude oil, resisting collapse and fluid drainage. It has further been found that foamed gels can be formulated to have completion, workover, and kill fluid performance characteristics similar to those of corresponding conventional gels absent an added gas. Thus, it is apparent that, like conventional gels, the present foamed gels can be tailored to meet the specific performance requirements of a given completion, workover, or kill operation, but at a substantially reduced chemical cost relative to the cost of a conventional gel. The foamed gels also have a substantially lower density than conventional gels, rendering the foamed gels advantageous in formations having a relatively low fracture or parting pressure gradient. A relatively low fracture or parting pressure gradient is typically a pressure gradient below about 9.7 kPa/m.

In the practice of the present invention, the foamed gel is designed in accordance with its particularly desired function, the nature of the completion, workover, or kill operation, and the characteristics of the formations in which the operation is being performed. Thus, the foamed gel is designed with a structure sufficient to substantially eliminate leakoff across the wellbore face when an appropriate amount of the foamed gel is employed. Foamed gels satisfying these criteria typically have a dynamic oscillatory viscosity at 0.1 radians per second between about $5 \times 10^1$ and about $1 \times 10^9$ cp, and preferably between about $5 \times 10^2$ and about $5 \times 10^5$ cp. If the formations encountered are easily fractured or parted, have a relatively low permeability matrix, or are essentially free of anomalies in direct communication with the wellbore, the foamed gel is formulated to have a relatively low strength. However, when a high permeability matrix, a high frequency of high permeability anomalies, or disproportionately large anomalies are encountered in formations through which the wellbore is being drilled, the foamed gel is formulated to have a relatively high strength for leakoff minimization.

The volume of foamed gel injected into the wellbore is an amount which is at least sufficient to fill the wellbore and the adjacent high permeability voids to the point of preventing reservoir fluids from entering the wellbore plus a minor amount which might be lost by leakoff into the formation. Thus, the volume required is a function of the wellbore configuration and the adjacent formation. If the wellbore is a uniform borehole free of adjacent anomalies, a relatively small volume of foamed gel will be required for the completion, workover, or kill operation. However, if the borehole is irregular with many anomalies in direct communication therewith, larger volumes of foamed gel may be required for the completion, workover, or kill operation. In any case, the present process has utility in both cased and uncased wellbores, depending on the particular operation it is complementing.

The present invention can be practiced using the foamed gel as a primary treatment material according to the manner set forth above. In another embodiment of the invention, the foamed gel is employed in a remedial role after the failure of a conventional well completion, workover, or kill treatment. If one has attempted a completion, workover, or kill treatment using large volumes of a conventional material, such as a foam or polymer enhanced foam containing a water-soluble uncrosslinked polymer, with little apparent success, the conventional treatment is terminated, and the treatment process of the present invention is performed in the manner described above to effectively complete, work over, or kill the well. In any case, the treatment of the present invention is most preferred for completion, workover, and kill treatments in wells having significant high permeability anomalies in direct communication with the wellbore, which should cause, or already have caused, significant leakoff of conventional completion, workover, or kill fluids from the wellbore.

It is believed that the foamed gel completion, workover, and kill fluid of the present invention prevents leakoff by forming a filter cake and/or causing substantial permeability reductions at the wellbore face. As used herein, the term "filter cake" refers to a foamed gel from which a portion of the original water and/or gas has leaked off, thereby increasing the strength and plugging capacity of the foamed gel. Thus, the flow of fluids across the face is prevented by plugging high permeability anomalies in fluid communication with the wellbore. Because a properly designed foamed gel functioning as a completion, workover, or kill fluid does not normally exhibit significant penetration of the formation matrix beyond the wellbore face, substantially all of the permeability reduction in the formation attributable to the foamed gel usually occurs immediately adjacent to wellbore face, i.e., within about 1 to 5 centimeters thereof. Consequently, the present foamed gels are essentially non-damaging to the formation and do not substantially inhibit the subsequent recovery of hydrocarbon fluids from the formation across the wellbore face.

The foamed gel used in the present invention is generally maintained in the wellbore throughout the performance of the wellbore operation. Although the foamed gel is formulated to minimize leakoff, a small amount may enter adjacent anomalies. The gel should be formulated and placed such that it enables one to perform the desired operation in the wellbore without substantially interfering with the operation. For example, a more flowing foamed gel is required for operations which involve significant movement of equipment into and/or out of the wellbore. Once the wellbore operation is completed, it is usual to begin or resume injection of fluids into the formation or production of formation fluids from the wellbore, depending on whether the wellbore is an injection or production wellbore. In most cases, it is desirable to remove the foamed gel from the wellbore before injecting or producing fluids. Therefore, it is desirable that the foamed gel be easily removed from the wellbore and adjacent anomalies establish or restore fluid production or injection.

The foamed gel of the present invention may be removed by any conventional means, such as by producing fluids from the formation through the wellbore. Alternatively, residual foamed gel can be removed from the wellbore with a high-pressure water washing tool. If it is nevertheless desired to remove residual foamed gel from the wellbore and/or wellbore face following the completion, workover, or kill operation, the foamed gel is fully reversible by conventional gel breakers, such as peroxides, hypochlorites, or persulfates. The foamed gel is "energized." Thus, if any foamed gel has invaded the formation, a reduction in pressure in the wellbore will cause the gas in the foamed gel to expand, thereby driving a significant portion of the foamed gel from the formation into the wellbore. If the gel unacceptably inhibits the flow of fluids, the problem can be remedied by perforating the matrix beyond the layer of gel penetration.

In one embodiment of the present invention, a foamed polymer gel composition is formulated at the surface and placed in a wellbore penetrating a subterranean formation prior to or during performance of the oil field wellbore operation. The foamed gel is a homogeneous fluid admixture of the gas, solvent, polymer, crosslinking agent, and surfactant. Surface admixing broadly encompasses batch mixing the components in bulk prior to injection into the wellbore or mixing the components in-line during injection into the wellbore. Typically, the gelation solution is prepared by mixing discrete aqueous solutions of the polymer, crosslinking agent, and surfactant. It is preferred to combine the polymer and the surfactant first, then add the crosslinker, and finally add the gas. Alternatively, the gas can be added prior to the crosslinker. The composition is crosslinked to completion at the surface and has sufficient structure that it is nonflowing with respect to entry into the formation matrix across the wellbore face. Alternatively, the foamed gel can be formed in the wellbore. The presence of the foamed gel in the wellbore and adjacent anomalies enables one to maintain the well uncapped and completely open to the surface during the performance of the operation, if desired or required.

Placement and circulation of the foamed gel in a wellbore as a completion, workover, or kill fluid is performed in accordance with a number of different embodiments. The foamed gel of the present invention may be placed in the wellbore at the outset of a conventional completion, workover, or kill operation. In another embodiment, the foamed gel is a lost circulation material added to a conventional completion, workover, or kill fluid. The resulting composition is placed in the wellbore for use in a completion, workover, or kill procedure. Alternatively, the foamed gel can supplement the conventional completion, workover, or kill fluid that is permitted to remain in the wellbore when leakoff is detected.

The following examples demonstrate the practice and utility of the present invention, but are not to be construed as limiting the scope thereof.

EXAMPLE 1

A flooding experiment is performed at ambient temperature in a 122 cm long sandpack having a permeability of 130,000 md. The sandpack is at residual saturation with crude oil and a synthetic oilfield brine having significant hardness and sulfate concentrations. A gelation solution is prepared containing the above-described synthetic brine, 9,000 ppm PHPA, 170 ppm trivalent chromium ion complexed within a chromic acetate complex, and 3,000 ppm $C_{14-16}$ alpha olefin sulfonate surfactant. The PHPA is 2.1 mole % hydrolyzed and has a molecular weight of 11,000,000. The gelation solution is injected into the sandpack prior to any substantial gelation thereof, and the apparent in situ viscosity of the gelation solution is measured as 240 cp. Thereafter, the substantially ungelled gelation solution and nitrogen gas are coinjected into the 130,000 md sandpack, and the apparent in situ viscosity of the coinjected composition is measured as 220 cp. A fine-textured foam is produced from the sandpack having a foam quality of 88% at atmospheric pressure.

The injected composition is allowed to age to a mature crosslinked foamed gel in the sandpack. Thereafter, the sandpack is flooded with the synthetic brine for 120 hours while maintaining the differential pressure at 172 kPa. After 120 hours the permeability reduction ($k_f/k_i$) of the sandpack to the synthetic brine is measured to be $8 \times 10^{-7}$, wherein the final permeability, $k_1$, is 0./1 md. Upon completion of the synthetic brine flood, the sandpack is flooded with nitrogen gas by applying a 345 kPa differential pressure across the sandpack. No throughput of any fluids, including gas, is observed during this stage of gas flooding. The results of Example 1 show that the above-described foamed gel does not exhibit significant migration through the high permeability sandpack under a relatively high differential pressure. Thus, it can be inferred that the instant foamed gel would not significantly penetrate a wellbore face into normal permeability matrix during a completion, workover, or kill operation, thereby showing the instant foamed gel to be an effective completion, workover, or kill fluid capable of plugging a wellbore face and preventing fluid flow therethrough.

EXAMPLE 2

A flooding experiment is performed at ambient temperature in a 30.5 cm long sandpack having a permeability of 126,000 md. The sandpack is at residual saturation with a crude oil and a synthetic oilfield brine having different compositions than those of Example 1. A gelation solution is prepared containing the synthetic brine, 7,000 ppm PHPA, 160 ppm trivalent chromium ion complexed within a chromic acetate complex, and 2,000 ppm $C_{14-16}$ alpha olefin sulfonate surfactant. The PHPA is 1.9 mole % hydrolyzed and has a molecular weight of 11,000,000. The gelation solution is injected into the sandpack prior to any substantial gelation thereof and the apparent in situ viscosity of the gelation solution is measured as 230 cp. Thereafter, the substantially ungelled gelation solution and nitrogen gas are coinjected into the 126,000 md sandpack and the apparent in situ viscosity of the coinjected composition is measured as 140 cp. A fine-textured foam is produced from the sandpack having a foam quality of 82% at atmospheric pressure.

The coinjected composition is allowed to age to a mature crosslinked foamed gel in the sandpack. Thereafter, the sandpack is flooded with the synthetic brine for 145 hours at a differential pressure of 345 kPa. After 145 hours, the permeability reduction ($k_f/k_i$) of the sandpack to the synthetic brine is measured to be $6 \times 10^{-7}$, wherein $k_f$ is 0.08 md. The results of Example 2 reaffirm that the above-described foamed gel can perform as an effective completion, workover, or kill fluid capable of face plugging permeable matrix and preventing fluid flow therethrough.

EXAMPLE 3

Several oil-producing wells of a shallow-water offshore platform need to be killed in order to perform wellhead and near sea-floor-level workover operations. The wells produce from an abnormally low-pressured carbonate formation at 1,130 m true vertical depth. The formation contains numerous naturally occurring micro fractures, exhibits an exceptionally low fracture or parting pressure gradient, and is easily damaged by conventional water-based drilling, completion, kill, and workover fluids.

During a workover operation in the first well, substantial fluid loss occurs when the well is killed with a conventional water-base kill fluid. When the well is put back on production, the well's productivity index (PI) is reduced by 72% initially. After six months of production and two acid-stimulation treatments, the well still exhibits a 63% PI loss.

In order to attempt to avoid such a catastrophic loss in well PI, a foamed-gel workover fluid is employed in the next two workover operations. The foamed gel is preformed at the surface prior to injection into the wellbore. First, a crosslinker solution is prepared by preaging a combination which is 85 wt % $CrAc_3$ and 15 wt % $CrCl_3$ in an aqueous solution. Next, the aqueous phase of the foamed gel is prepared with seawater which contains 8,300 ppm of drilling-fluid grade PHPA of about 5,000,000 MW and about 30% hydrolysis, the crosslinker solution, and 2,000 ppm $C_{14-16}$ alpha olefin sulfonate surfactant. The weight ratio of PHPA to crosslinking agent in the aqueous phase is 50:1. The aqueous pregel solution contains 166 ppm of crosslinking agent and about 40 ppm of Cr(III). The foamed gel is formulated with nitrogen as the gas phase so as to have an average foam quality within the wellbore of 67%. No fluid loss is detected during the foamed gel kill operation.

Following the workover operations, the two wells initially produce at 73 and 86%, respectively, of their preworkover PIs. Following a light acid stimulation treatment in each well and two weeks of post workover production and cleanup, the PIs of the two wells are 94% and 121%, respectively, of their preworkover PIs.

These results are interpreted to clearly demonstrate the benefits of using a foamed gel kill fluid, over conventional water-base kill fluids, within the wells of the oilfield in question.

I claim:

1. A process employing a foamed gel to substantially reduce the flow of fluid between a subterranean formation below an earthen surface and a wellbore penetrating the formation, the formation containing a formation fluid at a formation fluid pressure, the process comprising the steps of:

forming a foamed gel which comprises an aqueous solvent, a water-soluble carboxylate-containing polymer crosslinked by a water-soluble crosslinking agent containing a reactive transition metal cation, a water-soluble surfactant, and an added gas;

placing in said wellbore a volume of said foamed gel sufficient to create a hydrostatic head which exerts a fluid pressure against said formation fluid substantially equal to or greater than said formation fluid pressure, the foamed gel substantially preventing the flow of said formation fluid into said wellbore and substantially incapable of flowing into said formation; and performing a wellbore operation after placing said volume of said foamed gel in said wellbore, wherein the operation is a completion, workover, or kill operation.

2. The process of claim 1 comprising the additional step of removing said foamed gel from said wellbore, thereby allowing fluid flow between said wellbore and said formation.

3. The process of claim 1 wherein said foamed gel is formed by the steps of:

forming a gelation solution from a water-soluble carboxylate-containing uncrosslinked polymer, said crosslinking agent, said surfactant, and said solvent;

mixing said gelation solution with said added gas; and substantially crosslinking said polymer with said crosslinking agent after said solution and said added gas are mixed.

4. The process of claim 3 wherein said added gas is mixed with said solution after said crosslinking agent.

5. The process of claim 1 wherein said foamed gel is formed by the steps of:

forming a solution from a water-soluble carboxylate-containing uncrosslinked polymer, said surfactant, and said solvent;

mixing said solution with said added gas;

then mixing said solution with said crosslinking agent; and substantially crosslinking said polymer with said crosslinking agent after said solution and said added gas are mixed.

6. The process of claim 1 wherein said foamed gel is formed at the surface and thereafter injected into said wellbore.

7. The process of claim 1 wherein said foamed gel is formed by mixing said added gas and said solvent, polymer, crosslinking agent, and surfactant as they are coinjected into said wellbore.

8. The process of claim 1 wherein said foamed gel is formed by mixing said added gas and said solvent, polymer, crosslinking agent, and surfactant within said wellbore.

9. The process of claim 1 wherein said carboxylate-containing polymer is an acrylamide-containing polymer.

10. The process of claim 9 wherein said acrylamide-containing polymer is selected from the group consisting of polyacrylamide; partially hydrolyzed polyacrylamide; copolymers, terpolymers and tetrapolymers of acrylamide; and mixtures thereof.

11. The process of claim 1 wherein said surfactant is selected from the group consisting of ethoxylated sulfates, ethoxylated alcohols, petroleum sulfonates, alpha olefin sulfonates, and mixtures thereof.

12. The process of claim 1 wherein said reactive transition metal cation is trivalent chromium.

13. The process of claim 1 wherein said crosslinking agent is an organic salt of trivalent chromium.

14. The process of claim 1 wherein said crosslinking agent is a complex including trivalent chromium and one or more anionic carboxylate ligands.

15. The process of claim 14 wherein said one or more anionic carboxylate ligands is acetate.

16. The process of claim 14 wherein said one or more anionic carboxylate ligands is propionate.

17. The process of claim 1 wherein said foamed gel has a hydrostatic pressure gradient in said wellbore less than the fracture pressure gradient of said formation.

18. The process of claim 1 wherein said foamed gel has a hydrostatic pressure gradient in said wellbore less than the parting pressure gradient of said formation.

19. The process of claim 1 wherein said wellbore is uncased.

20. The process of claim 1 wherein said wellbore is cased.

21. The process of claim 1 wherein said foamed gel substantially plugs a wellbore face of said wellbore, thereby inhibiting fluid leakoff from said wellbore across said wellbore face into said formation.

22. The process of claim 1 wherein said foamed gel additionally comprises a solid particulate material.

23. The process of claim 1 wherein said foamed gel additionally comprises a gel breaker.

24. The process of claim 1 wherein said foamed gel is combined with a second completion, workover, or kill fluid.

25. The process of claim 1 wherein said formation fluid comprises hydrocarbons.

26. The process of claim 1 wherein said wellbore is a production well.

27. A process employing a foamed gel to substantially reduce the flow of fluid between a subterranean formation below an earthen surface and a wellbore penetrating the formation, the formation containing a formation fluid at a formation fluid pressure, the process comprising the steps of:

placing a fluid in a wellbore for a wellbore operation selected from the group consisting of completion, workover, and kill operations;

commencing said wellbore operation;

forming a foamed gel which comprises an aqueous solvent, a water-soluble carboxylate-containing polymer crosslinked by a water-soluble crosslinking agent containing a reactive transition metal cation, a water-soluble surfactant, and an added gas;

placing in said wellbore a volume of said foamed gel sufficient to create a hydrostatic head which exerts a fluid pressure against said formation fluid substantially equal to or greater than said formation fluid pressure, the foamed gel substantially preventing the flow of said formation fluid into said wellbore and substantially incapable of flowing into said formation; and continuing said wellbore operation after placing said volume of said foamed gel in said wellbore.

\* \* \* \* \*